United States Patent
Noreika et al.

(10) Patent No.: US 12,197,614 B1
(45) Date of Patent: Jan. 14, 2025

(54) STATELESS SYSTEM TO ENABLE DATA BREACH LOOKUP

(71) Applicant: UAB 360 IT, Vilnius (LT)

(72) Inventors: Vakaris Noreika, Vilnius (LT); Gerrit Stefan Garbereder, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 18/634,920

(22) Filed: Apr. 13, 2024

(51) Int. Cl.
*G06F 21/62* (2013.01)

(52) U.S. Cl.
CPC .................. *G06F 21/6218* (2013.01)

(58) Field of Classification Search
CPC .................................. G06F 21/6218
USPC ........................................... 713/193
See application file for complete search history.

(56) References Cited

U.S. PATENT DOCUMENTS

| | | | | |
|---|---|---|---|---|
| 5,764,766 A * | 6/1998 | Spratte | ........... | H04L 9/0838 |
| | | | | 380/283 |
| 5,796,830 A * | 8/1998 | Johnson | ........... | H04L 9/0894 |
| | | | | 380/277 |
| 9,954,828 B1 * | 4/2018 | Chandrasekhar | | H04L 9/0894 |
| 10,320,785 B2 * | 6/2019 | Morris | ........... | H04L 63/0876 |
| 11,265,148 B1 * | 3/2022 | Griffin | ........... | H04L 9/0643 |
| 11,528,131 B1 * | 12/2022 | Valkaitis | ......... | H04L 9/3242 |
| 2006/0288228 A1 * | 12/2006 | Botz | ........... | G06F 21/31 |
| | | | | 713/181 |
| 2009/0106561 A1 * | 4/2009 | Ejiri | ........... | G06F 21/62 |
| | | | | 713/193 |
| 2011/0239283 A1 * | 9/2011 | Chern | ........... | H04L 9/3213 |
| | | | | 726/6 |
| 2012/0066498 A1 * | 3/2012 | Engert | ........... | H04L 63/126 |
| | | | | 713/170 |
| 2013/0276120 A1 * | 10/2013 | Dalcher | ........... | G06F 21/567 |
| | | | | 726/22 |

(Continued)

FOREIGN PATENT DOCUMENTS

| | | | | |
|---|---|---|---|---|
| CN | 110912683 A | * | 3/2020 | ........ G06F 21/602 |
| CN | 112883115 A | * | 6/2021 | |

OTHER PUBLICATIONS

Jonas, Stephan, Simon Siewert, and Cord Spreckelsen. "Privacy-preserving record grouping and consent management based on a public-private key signature scheme: theoretical analysis and feasibility study." Journal of medical Internet research 21, No. 4 (2019): e12300. (Year: 2019).*

(Continued)

*Primary Examiner* — Luu T Pham
*Assistant Examiner* — Walter J Malinowski
(74) *Attorney, Agent, or Firm* — The Pattani Law Group (57) ABSTRACT

The present disclosure is directed to a stateless system to enable data breach lookup. The stateless system may include an infrastructure device and a user device. In some aspects, the infrastructure device and the user device may determine whether the private data associated with the user device has been compromised due to a breach. The infrastructure device and/or the user device may utilize a critical combination of one or more of fast hashing algorithms, slow hashing algorithms, secret keys, and salt values to conduct the data breach lookup. In this way, the data breach lookup may be conducted without the user device communicating the private data externally. Various other aspects are contemplated.

20 Claims, 5 Drawing Sheets

(56) References Cited

U.S. PATENT DOCUMENTS

| | | | |
|---|---|---|---|
| 2014/0289325 A1* | 9/2014 | Solis | H04L 45/74591 |
| | | | 709/204 |
| 2015/0008829 A1* | 1/2015 | Lurie | H05B 47/175 |
| | | | 315/153 |
| 2016/0253518 A1* | 9/2016 | Matsuo | G06F 21/44 |
| | | | 726/30 |
| 2016/0300054 A1* | 10/2016 | Turgeman | G06F 21/36 |
| 2017/0085377 A1* | 3/2017 | Pogmore | H04L 9/0869 |
| 2017/0171185 A1* | 6/2017 | Camenisch | G06F 21/335 |
| 2019/0007434 A1* | 1/2019 | McLane | G06N 3/045 |
| 2020/0089862 A1* | 3/2020 | Mossoba | G06F 40/12 |
| 2020/0099721 A1* | 3/2020 | Golan | H04L 63/20 |
| 2020/0143084 A1* | 5/2020 | Rosenberg | H04L 63/0428 |
| 2020/0259896 A1* | 8/2020 | Sachs | H04W 12/04 |
| 2020/0301764 A1* | 9/2020 | Thoresen | G06F 9/45541 |
| 2020/0322382 A1* | 10/2020 | Wang | H04L 63/1408 |
| 2020/0336303 A1* | 10/2020 | Sierra | H04L 63/1475 |
| 2021/0117544 A1* | 4/2021 | Kurtz | G06F 21/567 |
| 2021/0182379 A1* | 6/2021 | Sanchez | H04L 63/123 |
| 2022/0044727 A1* | 2/2022 | Cambou | G11C 13/0059 |
| 2022/0069995 A1* | 3/2022 | Philipp | H04L 9/3218 |
| 2022/0191233 A1* | 6/2022 | Kras | G06F 21/6245 |
| 2022/0247678 A1* | 8/2022 | Atwal | H04L 45/645 |
| 2022/0311597 A1* | 9/2022 | Goel | H04L 9/0891 |
| 2022/0321331 A1* | 10/2022 | Kisley | H04L 9/0852 |
| 2022/0321555 A1* | 10/2022 | Stolbikov | H04L 9/3218 |
| 2023/0086191 A1* | 3/2023 | Jakobsson | H04L 9/3231 |
| | | | 705/66 |
| 2023/0122830 A1* | 4/2023 | Vescio | G06Q 10/06375 |
| | | | 705/7.37 |
| 2023/0403274 A1* | 12/2023 | Soppet | H04L 63/18 |
| 2023/0410847 A1* | 12/2023 | Turbide | H04L 65/611 |
| 2024/0121250 A1* | 4/2024 | Tamosiunas | H04L 63/0838 |
| 2024/0176869 A1* | 5/2024 | Idrizovic | G06F 21/53 |
| 2024/0250821 A1* | 7/2024 | Yang | G06F 9/45558 |

OTHER PUBLICATIONS

Krawczyk, Hugo, Mihir Bellare, and Ran Canetti. HMAC: Keyed-hashing for message authentication. No. rfc2104. 1997. (Year: 1997).*

Gonçalves, Ricardo, Ekaterina Leonova, Ricardo Puttini, and Anderson Nascimento. "A privacy-ensuring scheme for health data outsourcing." in 2015 International Conference on Cloud Technologies and Applications (CloudTech), pp. 1-7. IEEE, 2015. (Year: 2015).*

* cited by examiner

STATELESS SYSTEM TO ENABLE DATA BREACH LOOKUP

FIELD OF DISCLOSURE

Aspects of the present disclosure generally relate to use of computer hardware and/or software for protection of private data, and in particular to providing a stateless system to enable data breach lookup.

BACKGROUND

In the digital age, advancement in communication among devices over the open internet has ushered in an era of unprecedented connectivity and convenience. Such communication may include exchange of private data. The advancement in communication faces concerns regarding the security of the private data exchanged during such communication. As devices seamlessly share information, there are inherent risks of the private data becoming compromised.

Mitigating such inherent risks has become very important. Innovations in encryption technologies, secure protocols, and robust authentication mechanisms have become essential components of the efforts to fortify communication channels and safeguard the private data from unauthorized access. As things evolve, it has become crucial to strike a balance between fostering efficient communication and implementing security measures to prevent the compromise of the private data.

SUMMARY

In another aspect, the present disclosure contemplates a system comprising: an infrastructure device; and a user device in communication with the infrastructure device, wherein, to determine whether private data associated with the user device is compromised, the infrastructure device is configured to maintain a breach database including hashed salted data entries associated with data that is known to have become compromised; the user device is configured to first hash the private data to determine hashed private data; the user device is configured to transmit a first portion of the hashed private data to the infrastructure device; the infrastructure device is configured to determine a salt value based at least in part on hashing the portion of the hashed private data and a secret key; the infrastructure device is configured to transmit the salt value to the user device; the user device is configured to second hash the private data based at least in part on utilizing the salt value to determine hashed salted private data; the user device is configured to transmit a second portion of the hashed salted private data to the infrastructure device; the infrastructure device is configured to compare the second portion of the hashed salted private data with the hashed salted data entries in the breach database; the infrastructure device is configured to transmit, to the user device, one or more hashed salted data entries that match the second portion of the hashed salted private data; and the user device is configured to determine whether the private data is compromised based at least in part on comparing the hashed salted private data with the one or more hashed salted data entries.

In one aspect, the present disclosure contemplates a method in system including a user device in communication with an infrastructure device to determine whether private data associated with the user device is compromised, the method comprising: maintaining, by the infrastructure device, a breach database including hashed salted data entries associated with data that is known to have become compromised; first hashing, by the user device, the private data to determine hashed private data; transmitting, by the user device, a first portion of the hashed private data to the infrastructure device; determining, by the infrastructure device, a salt value based at least in part on hashing the portion of the hashed private data and a secret key; transmitting, by the infrastructure device, the salt value to the user device; second hashing, by the user device, the private data based at least in part on utilizing the salt value to determine hashed salted private data; transmitting, by the user device, a second portion of the hashed salted private data to the infrastructure device; comparing, by the infrastructure device, the second portion of the hashed salted private data with the hashed salted data entries in the breach database; transmitting, by the infrastructure device to the user device, one or more hashed salted data entries that match the second portion of the hashed salted private data; and determining, by the user device, whether the private data is compromised based at least in part on comparing the hashed salted private data with the one or more hashed salted data entries.

In another aspect, the present disclosure contemplates a non-transitory computer-readable medium configured to store instructions, which when executed by a user device and an infrastructure device in communication with each other to determine whether private data associated with the user device is compromised, configure: the infrastructure device to maintain a breach database including hashed salted data entries associated with data that is known to have become compromised; the user device to first hash the private data to determine hashed private data; the user device to transmit a first portion of the hashed private data to the infrastructure device; the infrastructure device to determine a salt value based at least in part on hashing the portion of the hashed private data and a secret key; the infrastructure device to transmit the salt value to the user device; the user device to second hash the private data based at least in part on utilizing the salt value to determine hashed salted private data; the user device to transmit a second portion of the hashed salted private data to the infrastructure device; the infrastructure device to compare the second portion of the hashed salted private data with the hashed salted data entries in the breach database; the infrastructure device to transmit, to the user device, one or more hashed salted data entries that match the second portion of the hashed salted private data; and the user device to determine whether the private data is compromised based at least in part on comparing the hashed salted private data with the one or more hashed salted data entries.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

Figure 1:
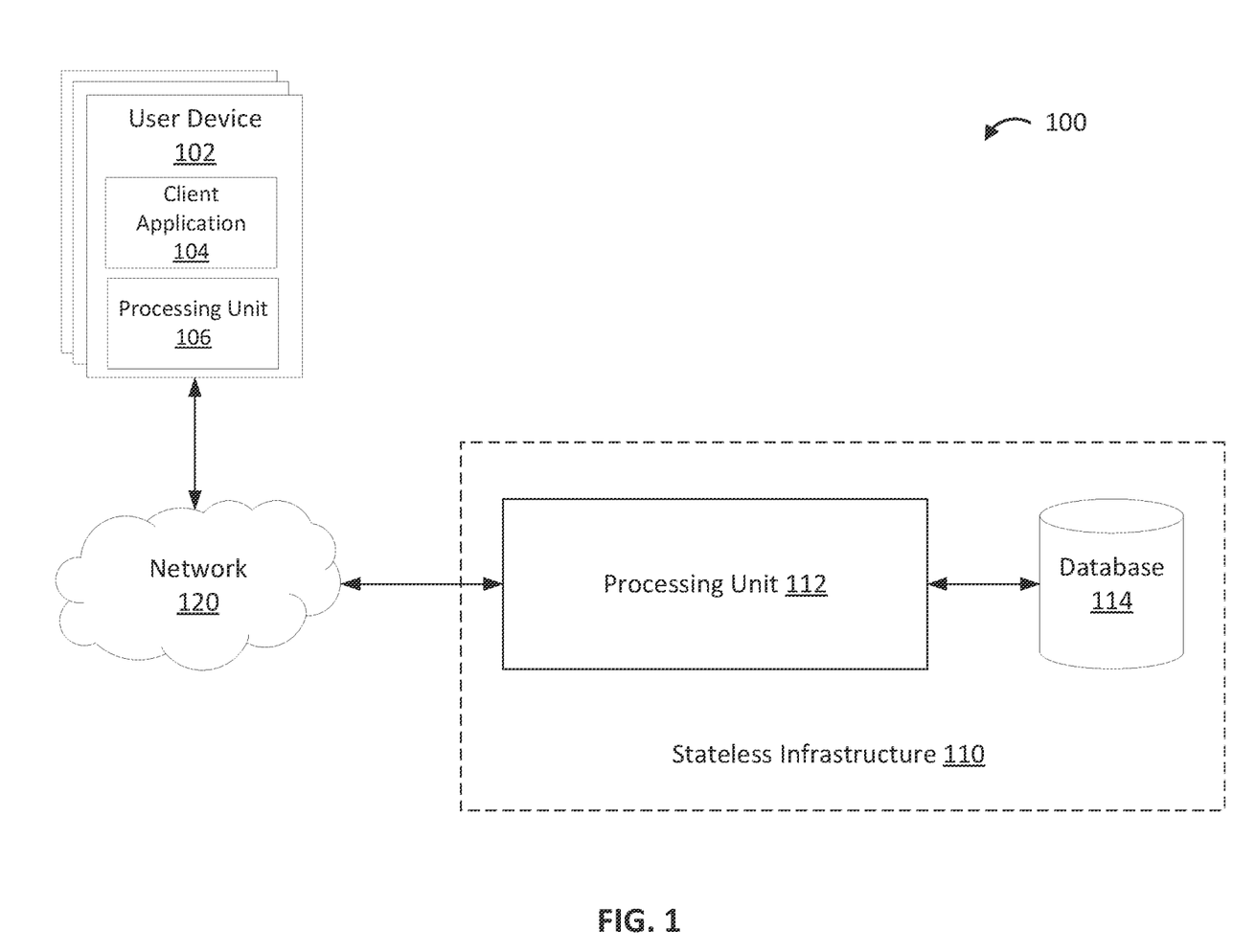
FIG. 1 is an illustration of an example system associated with a stateless system to enable data breach lookup, according to various aspects of the present disclosure.

FIG. 1 is an illustration of an example system 100 associated with a stateless system to enable data breach lookup, according to various aspects of the present disclosure. The system 100 includes one or more user devices 102 communicating with a stateless infrastructure 110 to enable the data breach lookup. A user device 102 may include a processing unit 106 and may utilize an installed client application 104 to communicate with an application programming interface (API) (not shown) included in the stateless infrastructure 110. The stateless infrastructure may include a processing unit 112 and a database (e.g., memory) 114. In some aspects, the user device 102 and the stateless infrastructure 110 may communicate with one another over a network 120. In some aspects, a given user device 102 may communicate with another device (e.g., another user device, server, etc.) over the network 120.

The user device 102 may be a physical computing client device capable of hosting a client application and of connecting to the network 120. The user device 102 may be, for example, a laptop, a mobile phone, a tablet computer, a desktop computer, a smart device, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The user device 102 may include and/or may be associated with a communication interface to communicate (e.g., receive and/or transmit) data.

In some aspects, the stateless infrastructure 110 may configure and provide the user device 102 with a client application 104 to be installed on the user device 102. The client application 104 may be configured to enable a processor (e.g., processing unit 106, processor 520) associated with the user device 102 to perform operations (e.g., hashing, etc.) on data. In some aspects, the user device 102 and/or the stateless infrastructure 110 may utilize one or more algorithms to hash the data. Hashing algorithms may include cryptographic functions that transform input data of any size into an array of bytes (e.g., a string of characters), typically a hash value or hash code. Primary characteristics of a good hashing algorithm may include being deterministic and being resistant to collisions (e.g., different inputs producing the same hash).

The hashing algorithms may include fast algorithms that deliver more than a threshold amount of hashes per unit time (e.g., per second). Such fast algorithms may include a Secure Hash Algorithm (SHA) algorithm, including variants such as, for example, SHA-1, SHA-3, SHA-224, SHA-256, SHA-384, and SHA-512. SHA-256. The hashing algorithms may also include slow algorithms that deliver fewer than a threshold amount of hashes per unit time (e.g., per second). Such slow algorithms may include algorithms such as, for example, Argon2, Blake2, etc. In some aspects, fast hashing algorithms and slow hashing algorithms may differ in their design and purpose, with key distinctions being a level of computational intensity and resistance to brute-force attacks. For instance, fast hashing algorithms may involve lower than a threshold amount of computational intensity while slow hashing algorithms may involve higher than the threshold amount of computational intensity and/or memory intensity. In another example, fast hashing algorithms may be less resistant and more susceptible to brute-force attacks while slow hashing algorithms may be more resistant and less susceptible to brute-force attacks. This makes reverse hashing of slow hashing algorithms nearly impossible.

In some aspects, the data may contain private information. In some aspects, the data may include information stored in files, photographs, documents, compact discs (CDs), digital video disks (DVDs), etc. including written, printed, and/or electronic matter.

The stateless infrastructure 110 may include the processing unit 112 and the database 114. The processing unit 112 may include a logical component configured to perform complex operations to evaluate various factors associated with hashing data. The database 114 may store various pieces of information associated with hashing the data. The processing unit 112 may utilize one or more fast algorithms and/or slow algorithms to hash the data. As noted above, hashing algorithms may include cryptographic functions that transform input data of any size into a string of characters, typically a hash value or hash code. In some aspects, the processing unit 112 may utilize one or more secret keys along with the hashing algorithms to hash the data. The processing unit 112 may utilize a random key generator to generate the one or more secret keys. In some aspects, the one or more secret keys may be confidential to (e.g., known only to) the stateless infrastructure 110.

The stateless infrastructure 110 may include an application programming interface (API) (not shown) to communicate with the client application 104. The stateless infrastructure 110 may include or be associated with a communication interface to communicate (e.g., transmit and/or receive) data.

The network 120 may be a wired or wireless network. In some aspects, the network 120 may include one or more of, for example, a phone line, a local-area network (LAN), a wide-area network (WAN), a metropolitan-area network (MAN), a home-area network (HAN), Internet, Intranet, Extranet, and Internetwork.

Figure 5:
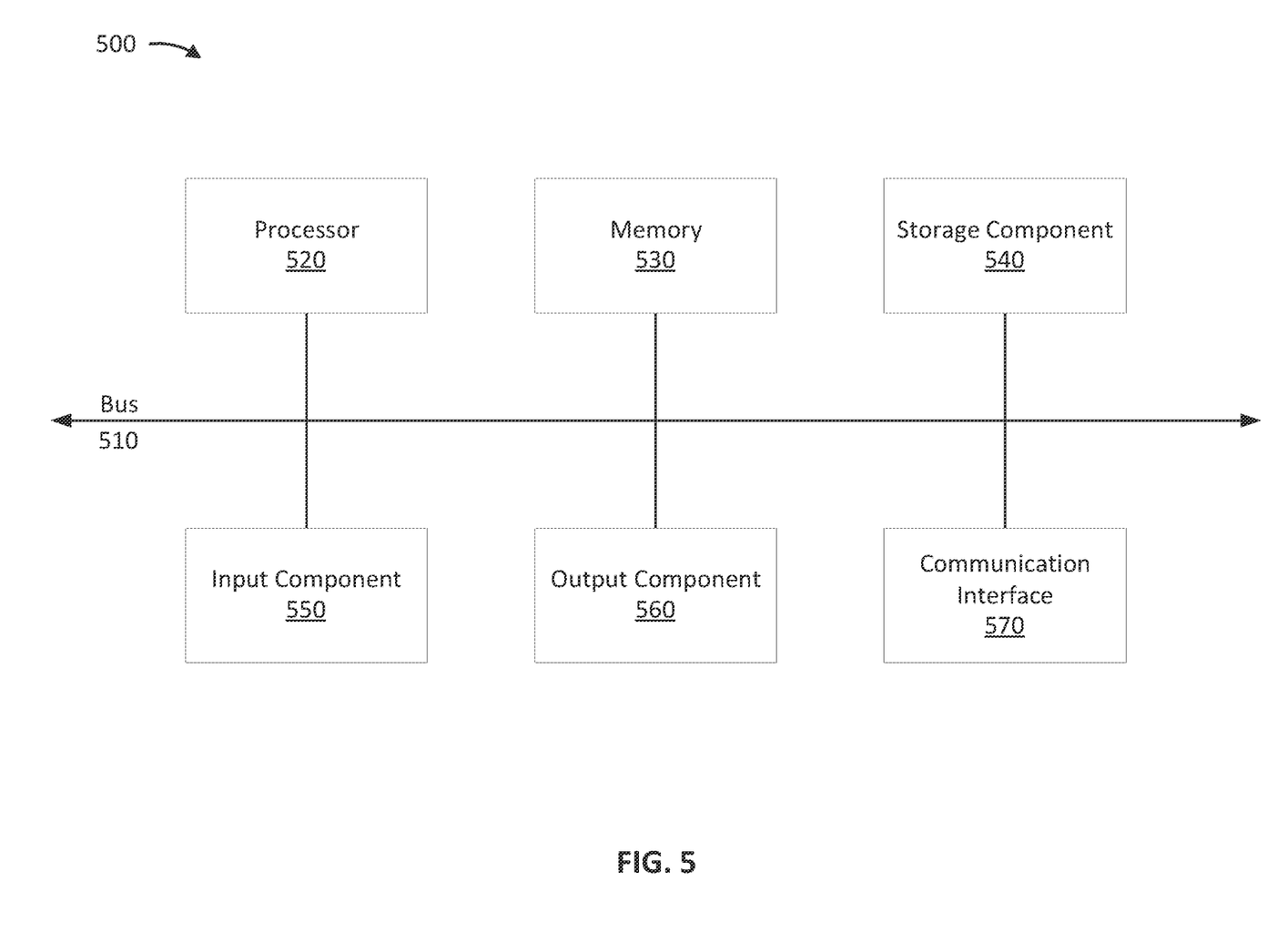
FIG. 5 is an illustration of example devices associated with a stateless system to enable data breach lookup, according to various aspects of the present disclosure.

One or more components (e.g., processing units, database, client application, etc.) included in example 100 shown in FIG. 1 may further be associated with a controller/processor, a memory, a communication interface, or a combination thereof (e.g., FIG. 5). For instance, the one or more components may include or may be included in a controller/processor, a memory, or a combination thereof. In some aspects, the one or more components may be separate and distinct from each other. Alternatively, in some aspects, the one or more components may be combined with another one of the one or more components. In some aspects, the one or more components may be local with respect to another one of the one or more components. Alternatively, in some aspects, the one or more components may be located remotely with respect to another one of the one or more components. Additionally, or alternatively, the one or more components may be implemented at least in part as software stored in a memory for execution by a processor. For example, a component (or a portion of a component) may be implemented as instructions or code stored in a non-transitory computer-readable medium and executable by a controller or a processor to perform the functions or operations of the component. Additionally, the one or more components may be configured to perform one or more functions described as being performed by another one of the one or more components.

As indicated above, FIG. 1 is provided as an example. Other examples may differ from what is described with regard to FIG. 1.

A user device may wish to communicate (e.g., transmit and/or receive) information with other devices over a public network (e.g., open Internet). Such information may be related to and/or include high entropy private data such as, for example, usernames, passwords, tokens, etc. associated with authenticating the user device in connection with receiving network services from a network service provider. In another example, such information may be related to and/or include high entropy private data such as, for example, files, documents, photographs, etc. In yet another example, such information may be related to and/or include low entropy private data such as, for example, credit card numbers, bank account numbers, etc. associated with conducting financial transactions over the network. In some aspects, the high entropy data may include a type of data that is random and unpredictable in nature. For instance, high entropy data such as usernames, passwords, tokens, etc. may include a random and unpredictable combination of letters, numerals, and/or special characters. In some aspects, the low entropy data may include a type of data that is predictable in nature. For instance, low entropy data such as credit card numbers, bank account numbers, etc. may include only a given/known amount of numerals (e.g., a credit card number may include 16 digits).

In some instances, because the private data is communicated in unencrypted form over the public network, the private data may become compromised due to a data breach. In an example, a malicious party may gain unauthorized access to the private data by, for example, hacking into the communication over the public network and/or by perpetrating a man-in-the-middle attack with respect to the communication over the public network. In another example, data stored in unencrypted form may become compromised. For instance, an internal device associated with the network service provider (e.g., a network service provider employee device) with access to the communication may gain unauthorized access to the private data stored in unencrypted form. In some instances, the private data may become compromised due to disclosure of the private data over the public network.

Such data breaches may result in an integrity of the private data becoming compromised. To regain access to the private data and/or to protect related data (e.g., identification information of a user of the user device, a location of the user, contact information of the user, data communicated via the user device, etc.) after the data breach, the user device and/or the network service provider may inefficiently expend resources (e.g., management resources, memory resources, computational/processing resources, power consumption resources, system bandwidth, network resources, etc.) that may otherwise be utilized for more suitable tasks associated with the provision and receipt of the network services.

Additionally, the user device may be unaware of the data breach (e.g., the unauthorized access). In this case, until the user device becomes aware of the data breach, the unauthorized access may freely continue, thereby leading to access to the related data. In an example, based at least in part on examining the private data, the malicious party may freely determine the related data. In another example, based at least in part on examining the private data, the malicious party may gain access to information to enable the malicious party to freely observe activity of the user device over the public network, thereby compromising a privacy of the user. A delay in implementing restorative measures after occurrence of the data breach may irreparably compromise the private data and/or the related data. In this case, the user device and the network service provider may inefficiently expend resources (e.g., management resources, memory resources, computational/processing resources, power consumption resources, system bandwidth, network resources, etc.) to mitigate the effects of the delay in implementing the restorative measures.

Various aspects of systems and techniques discussed in the present disclosure provide a stateless system to enable data breach lookup. In some aspects, without the private data being communicated externally to the user device, the results of the data breach lookup may indicate whether the given private data associated with a user device has been compromised. The stateless infrastructure may configure and provide a client application to enable the user device to conduct the data breach lookup. In some aspects, the stateless infrastructure may determine a breach database indicating breach information (e.g., information that is publicly known to have become breached/compromised inadvertently or by a malicious party). In some aspects, the stateless infrastructure may maintain the breach database in real time by continuously monitoring for and updating the breach database with new breach information. In some aspects, the stateless infrastructure may periodically (e.g., every minute, every hour, every day, every week, etc.) maintain the breach database by periodically monitoring for and updating the breach database with the new breach information. The stateless infrastructure may calculate a series of hashes associated with one or more data entries in the breach information to determine a series of hashed data entries. Such calculation of hashes may include utilization of an arrangement of different types of hashing algorithms. This arrangement of the different types of hashing algorithms is critical to enabling the data breach lookup and to mitigating the private data from becoming compromised. The stateless infrastructure may then classify and store the hashed data entries based at least in part on a section (e.g., prefix, segment, suffix, etc.) of a string associated with each hashed data entry. To initiate the data breach lookup, the stateless infrastructure may configure the client application to periodically hash private data to determine hashed private data. Further, the stateless infrastructure may configure the client application to periodically transmit a portion of the hashed private data to the stateless infrastructure. The stateless infrastructure may process the portion of the hashed private data and compare a string associated with the portion of the hashed private data with the hashed data entries. The stateless infrastructure may transmit one or more hashed data entries having sections of strings that match the string associated with the portion of the hashed private data. Based at least in part on receiving the one or more hashed data entries, the client application may compare the received hashed data entries with the hashed private data. When one or more received hashed data entries match the hashed private data, the client application may determine that the private data has been breached/compromised. Alternatively, when no hashed data entry matches the hashed private data, the client application may determine that the private data has not been breached/compromised.

Without communicating the private data in unencrypted or unhashed form, externally from the user device, the stateless infrastructure and the user device may conduct the data breach lookup to determine whether the private data has been breached/compromised. When the private data has been breached/compromised, the user device may implement, without delay, restorative measures to mitigate effects of the data breach, thereby enabling efficient utilization of user device resources and/or stateless infrastructure resources (e.g., management resources, memory resources, computational/processing resources, power consumption resources, system bandwidth, network resources, etc.).

Further, due to the stateless nature of the system, the stateless infrastructure is completely unaware of the private data (that is not compromised). As such, an internal device associated with the stateless infrastructure (e.g., a stateless infrastructure employee device) may gain unauthorized access to the private data. Also, by hashing the private data, as discussed below in further detail, by utilizing the arrangement of one or more of fast hashing algorithms, slow hashing algorithms, secret keys, and salt values, the stateless system ensures that the private data may not be recovered by reversing the hashing. In some aspects, no information that may be utilized to recover the private data is transmitted out by the user device in unencrypted and/or unhashed form.

This arrangement is critical because it enables the stateless system to mitigate instances of the private data becoming breached/compromised. As a result, the stateless system enables the user device and the network service provider to conserve available resources (e.g., management resources, memory resources, computational/processing resources, power consumption resources, system bandwidth, network resources, etc.).

In some aspects, a system may include an infrastructure device and a user device in communication with the infrastructure device, wherein, to determine whether private data associated with the user device is compromised, the infrastructure device is configured to maintain a breach database including hashed salted data entries associated with data that is known to have become compromised; the user device is configured to first hash the private data to determine hashed private data; the user device is configured to transmit a first portion of the hashed private data to the infrastructure device; the infrastructure device is configured to determine a salt value based at least in part on hashing the portion of the hashed private data and a secret key; the infrastructure device is configured to transmit the salt value to the user device; the user device is configured to second hash the private data based at least in part on utilizing the salt value to determine hashed salted private data; the user device is configured to transmit a second portion of the hashed salted private data to the infrastructure device; the infrastructure device is configured to compare the second portion of the hashed salted private data with the hashed salted data entries in the breach database; the infrastructure device is configured to transmit, to the user device, one or more hashed salted data entries that match the second portion of the hashed salted private data; and the user device is configured to determine whether the private data is compromised based at least in part on comparing the hashed salted private data with the one or more hashed salted data entries.

Figure 2:
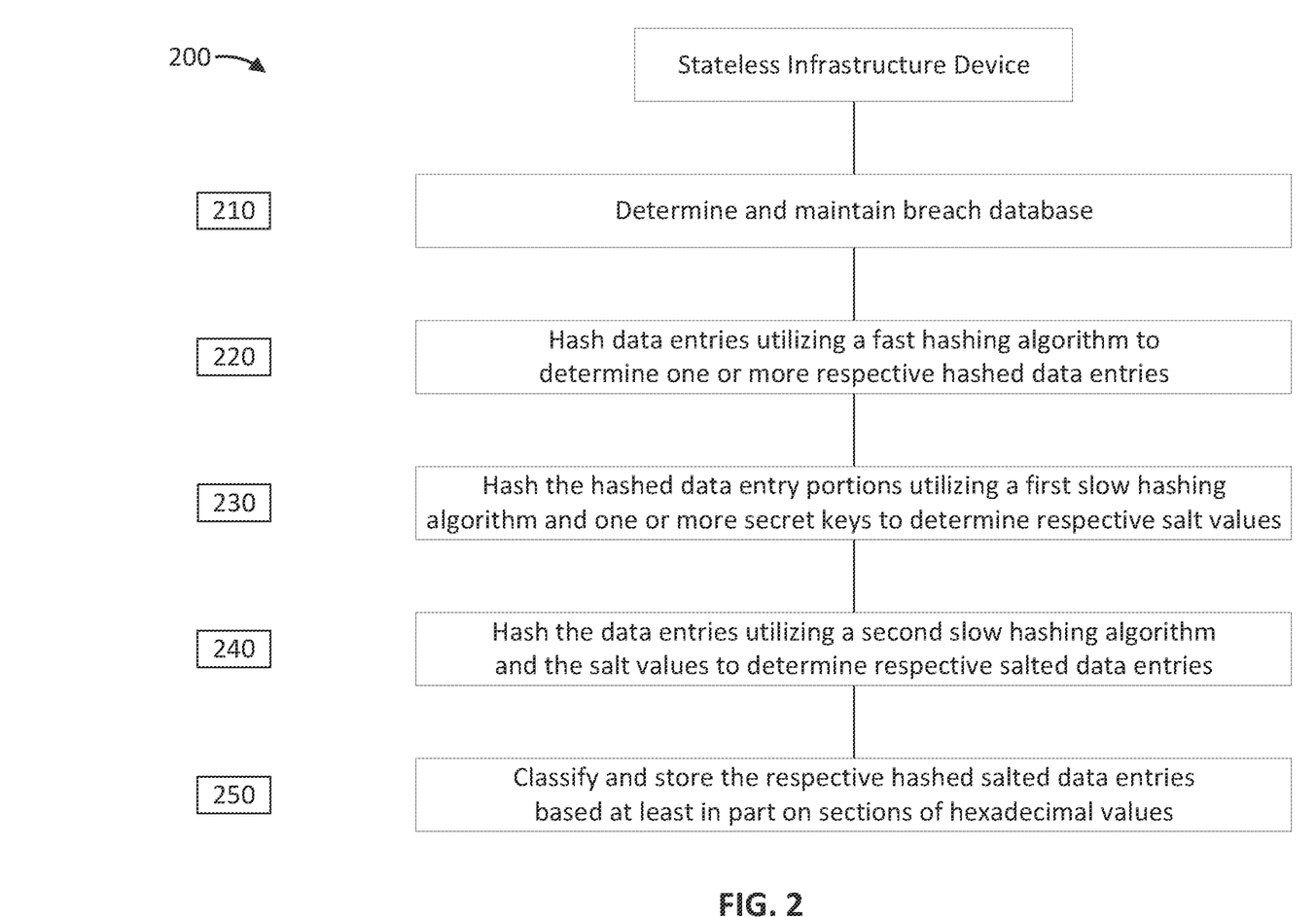
FIG. 2 is an illustration of an example flow associated with a stateless system to enable data breach lookup, according to various aspects of the present disclosure.

FIG. 2 is an illustration of an example flow 200 associated with a stateless system to enable data breach lookup, according to various aspects of the present disclosure. The example flow 200 may include a stateless infrastructure 110. In some aspects, the stateless infrastructure 110 may utilize the processing unit 112 and/or the database 114 to execute the example flow 200.

As shown by reference numeral 210, the stateless infrastructure 110 may determine and maintain a breach database. The breach database may include breach information containing data entries of private data (e.g., email addresses, contact information, phone numbers, bank account information, credit card information, personal health information, passwords, documents, files, etc., or a combination thereof) that is believed and/or known to have become breached/compromised through a data breach. Such information may include information compromised due to malware and/or phishing attacks. In some aspects, a data breach may include an incident that intentionally or accidentally exposes and/or compromises the private data.

The stateless infrastructure 110 may store the breach information in an associated memory (e.g., database 114). In some aspects, the stateless infrastructure 110 may compile the breach information based at least in part on scanning publicly available sources (e.g., public announcements, news, etc.). In some aspects, the stateless infrastructure 110 may compile the breach information based at least in part on receiving the breach information from third parties thereof. In some aspects, the stateless infrastructure 110 may compile the breach information based at least in part on receiving reports (e.g., survey data, complaints, feedback, or the like)

from various sources including, for example, user devices associated with the stateless infrastructure 110.

Further, the stateless infrastructure 110 may maintain the breach database. In some aspects, the stateless infrastructure 110 may continuously monitor availability of new breach information and may update, in real time, the breach database based at least in part on determining availability of the new breach information. In some aspects, the stateless infrastructure 110 may periodically (e.g., every minute, every hour, every day, every week, etc.) monitor availability of the new breach information and may update, periodically, the breach database based at least in part on determining availability of the new breach information. In some aspects, the stateless infrastructure 110 may periodically monitor availability of the new breach information and may update, at time selected by the user, the breach database based at least in part on determining availability of the new breach information.

As shown by reference numeral 220, based at least in part on updating the breach database, the stateless infrastructure 110 may hash one or more data entries to determine one or more respective hashed data entries. In some aspects, the stateless infrastructure 110 may utilize a fast hashing algorithm to hash the one or more data entries. In an example, the fast hashing algorithm may include one or more variants of the SHA algorithm, discussed elsewhere herein. In some aspects, as an output of the fast hashing algorithm, the one or more hashed data entries may be in hexadecimal form. In other words, the one or more hashed data entries may be represented by respective hexadecimal values including respective letters and/or numerals.

As shown by reference numeral 230, based at least in part on hashing the one or more data entries, the stateless infrastructure 110 may hash respective hashed data entry portions utilizing a first slow hashing algorithm and one or more secret keys to determine respective dynamic salt values. In some aspects, the stateless infrastructure 110 may determine the respective hashed data entry portions by extracting, for one or more hashed data entries, a predetermined combination of letters and/or numerals (e.g., characters) from the respective hexadecimal values. In an example, the stateless infrastructure 110 may determine the respective hashed data entry portions by extracting, for the one or more hashed data entries, prefixes including a predetermined amount (e.g., the first five (or any other number)) of letters and/or numerals. In another example, the stateless infrastructure 110 may determine the respective hashed data entry portions by extracting, for the one or more hashed data entries, suffixes including a predetermined amount (e.g., the last five (or any other number)) of letters and/or numerals. In yet another example, the stateless infrastructure 110 may determine the hashed data entry portions by extracting, for the one or more hashed data entries, middle sections including a predetermined amount (e.g., five (or any other number)) of letters and/or numerals between respective first letters and/or numerals and respective last letters and/or numerals.

Further, the stateless infrastructure 110 may determine one or more secret keys based at least in part on utilizing a random key generator. In some aspects, the stateless infrastructure 110 may utilize a single secret key to hash the respective hashed data entry portions. In some aspects, the stateless infrastructure 110 may utilize respective secret keys to hash the respective hashed data entry portions. The one or more secret keys may be confidential to (e.g., known only to) the stateless infrastructure 110.

Based at least in part on determining the hashed data entry portions and/or the one or more secret keys, the stateless infrastructure 110 may utilize the first slow hashing algorithm (e.g., Blake2B, BLAKE, BLAKE3, ChaCha, etc.) to hash the respective hashed data entry portions and the one or more secret keys. In some aspects, the respective hashed data entry portions and the one or more secret keys may be provided as inputs for hashing. It is critical to use a slow hashing algorithm at this stage to hash the respective hashed data entry portions because the slow hashing algorithm is more resistant and less susceptible to brute-force attacks. As output, the first slow hashing algorithm may yield one or more respective salt values corresponding to the respective hashed data entry portions (and/or to the data entries).

Based at least in part on determining the respective salt values, as shown by reference numeral 240, the stateless infrastructure 110 may utilize a second slow hashing algorithm (e.g., Argon2ID) to again hash the data entries and the respective salt values to determine hashed salted data entries. It is critical to use a slow hashing algorithm at this stage to hash the respective hashed data entry portions because the slow hashing algorithm is more resistant and less susceptible to brute-force attacks. In some aspects, the second slow hashing algorithm may be different from the first slow hashing algorithm.

In some aspects, the stateless infrastructure 110 may apply the respective salt values to the data entries prior to utilizing the second slow hashing algorithm. Applying the respective salt values may include adding random characters from the respective salt values to the respective data entries. Such random characters may be added as a prefix to a data entry, as a suffix to a data entry, and/or anywhere in the middle of a data entry. For instance, if a data entry includes a password, the random characters may be added as a prefix to the password, as a suffix to the password, and/or anywhere in the middle of the password. This enables obfuscating the respective data entries and making it more difficult to reverse the hashing process to recover the data entries in unhashed plaintext form.

As shown by reference numeral 250, the stateless infrastructure 110 may classify and store the respective hashed salted data entries in an associated electronic memory (e.g., database 114). In some aspects, when the respective hashed salted data entries are represented by hexadecimal values (as discussed elsewhere herein), the stateless infrastructure 110 may classify the respective hashed salted data entries based at least in part on, for example, prefixes (or suffixes or predetermined sections) of the hexadecimal values.

In some aspects, the stateless infrastructure 110 may execute processes 210-250 to maintain the breach database as new breach information becomes available. By utilizing the above critical combination of one or more of fast hashing algorithms, slow hashing algorithms, secret keys, and salt values, the stateless infrastructure 110 may enable data breach lookup without having access to and/or storing the unhashed or unencrypted information that may be utilized to recover underlying data.

As indicated above, FIG. 2 is provided as an example. Other examples may differ from what is described with regard to FIG. 2.

Figure 3:
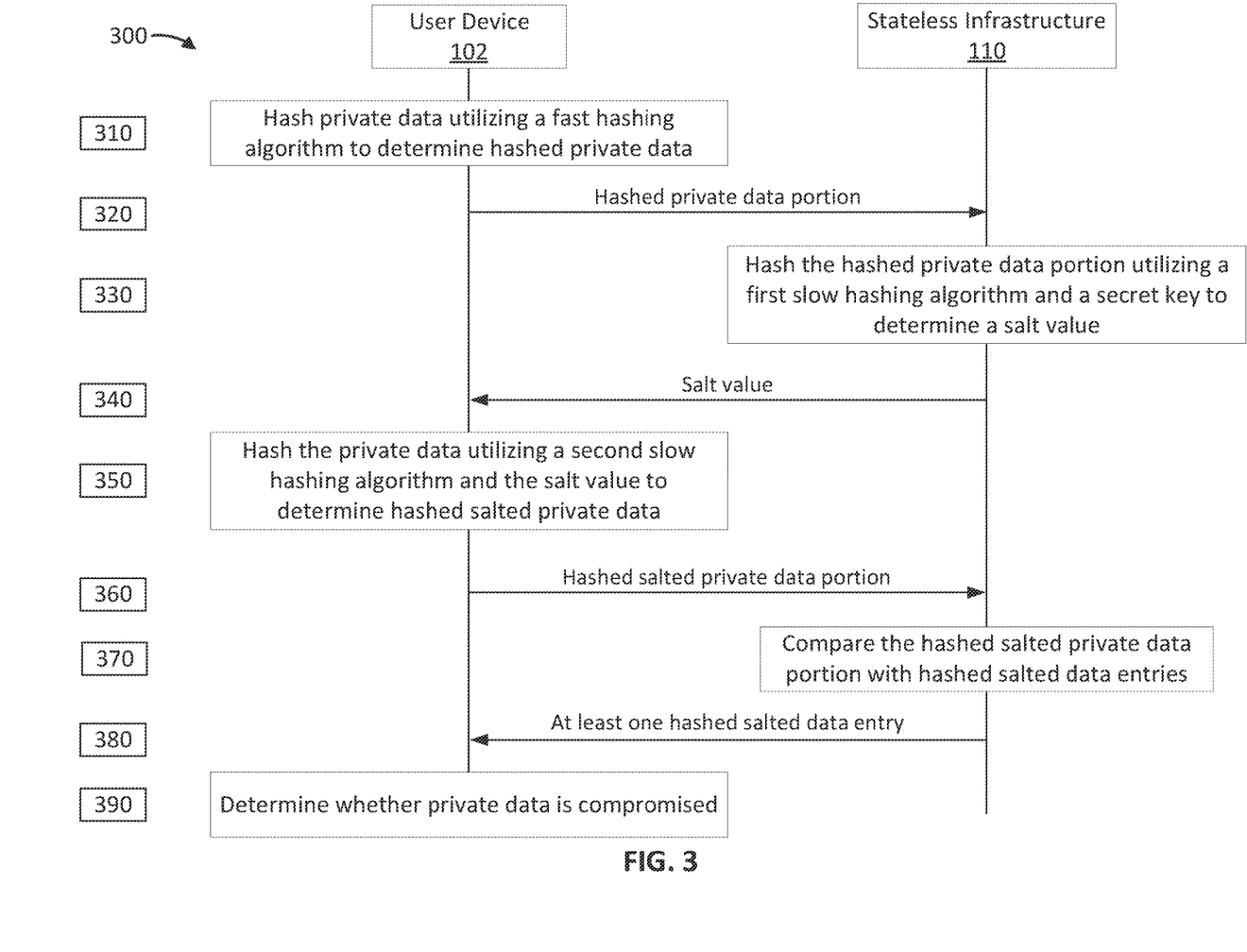
FIG. 3 is an illustration of an example flow associated with a stateless system to enable data breach lookup, according to various aspects of the present disclosure.

FIG. 3 is an illustration of an example flow 300 associated with a stateless system to enable data breach lookup, according to various aspects of the present disclosure. The example flow 300 may include a user device 102 (e.g., a first user device, a second user device, etc.) in communication with the stateless infrastructure 110. In some aspects, the user device 102 may be associated with a registered account with the stateless infrastructure 110 to receive network services. Further, the user device 102 may install a client application 104 configured and provided by the stateless infrastructure 110. The user device 102 may utilize the installed client application 104 along with an associated processor (e.g., processing unit 106) to execute flow 300. Also, the user device 102 may utilize the installed client application 104 to communicate with an application programming interface (API) and a processor (e.g., processing unit 112, processor 720) associated with the stateless infrastructure 110. In some aspects, the user device 102 and the stateless infrastructure may communicate over a network (e.g., network 120).

The user device 102 may wish to determine whether private data (e.g., usernames, passwords, tokens, files, documents, photographs, location, credit card numbers, bank account numbers, email addresses, phone numbers, or a combination thereof) has become compromised. In this case, the user device 102 and the stateless infrastructure 110 may execute flow 300 to conduct a data breach lookup regarding the private data, as discussed below.

The user device 102 may have access to private data in unencrypted and/or unhashed (e.g., plaintext) form. As shown by reference numeral 310, the user device 120 may hash a piece of private data to determine hashed private data. In an example, the piece of private data may include at least a portion of the private data (e.g., a portion of a password, a portion of an account number, or the like.). In another example, the piece of private data may include any combination of one or more from among a plurality of different private data (e.g., (i) one or more from a password, account number, etc. associated with a single user, (ii) one or more from multiple passwords respectively associated with different users, or the like). In some aspects, the user device 102 may utilize a fast hashing algorithm to hash the private data. In an example, the fast hashing algorithm may include one or more variants of the SHA algorithm, discussed elsewhere herein. In some aspects, the fast hashing algorithm may be the same fast hashing algorithm utilized in block 220. As an output of the fast hashing algorithm, the hashed private data may be in hexadecimal form. In other words, the hashed private data may be represented by a hexadecimal value including letters and/or numerals.

In some aspects, the stateless infrastructure 110 may configure the client application 104 to utilize the same fast hashing algorithm to hash the piece of private data as utilized by the state infrastructure 110 to hash the one or more data entries (block 220). Further, to account for modifications in the private data, the stateless infrastructure 110 may configure the client application 104 to determine and transmit a portion of the hashed private data to the stateless infrastructure 110 periodically (e.g., every 30 minutes, 60 minutes, 120 minutes, 300 minutes, etc.). In some aspects, the stateless infrastructure 110 may process the portion of the hashed private data received from the client application 104 to enable the user device 102 to determine, as discussed below, whether the private data has become breach/compromised.

Based at least in part on hashing the private data, the user device 102 may determine a hashed private data portion (e.g., a first portion of the hashed private data) by extracting a predetermined combination of letters and/or numerals (e.g., characters) from the hexadecimal value that represents the hashed private data. The extracted predetermined combination of letters and/or numerals may be referred to as an extracted part of the hexadecimal value that represents the hashed private data. In an example, the user device 102 may determine the hashed private data portion by extracting a prefix including a predetermined amount (e.g., the first five (or any other number)) of letters and/or numerals. In another example, the user device 102 may determine the hashed private data portion by extracting a suffix including a predetermined amount (e.g., the last five (or any other number)) of letters and/or numerals. In yet another example, the user device 102 may determine the hashed private data portion by extracting a middle section including a predetermined amount (e.g., five (or any other number)) of letters and/or numerals between the first letter and/or numeral and the last letter and/or numeral.

As shown by reference numeral 320, based at least in part on determining the hashed private data portion, the user device 102 may transmit the hashed private data portion to the stateless infrastructure 110. In some aspects, prior to transmitting the hashed private data portion, the stateless infrastructure 110 and/or the user device 102 may verify that the user device 102 is authorized to possess and/or access the private data in unencrypted and unhashed (e.g., plaintext) form and/or to transmit the hash of private data portion to the stateless infrastructure 110 to conduct the data breach lookup.

To initiate the verification, the user device 102 may transmit a message to the stateless infrastructure 110 indicating that the user device 102 is to transmit the hashed private data portion. Based at least in part on receiving the message, the stateless infrastructure 110 may utilize registration information, received from the user device 102 during registration of an account of the user device 102 with the stateless infrastructure 110, to transmit a one-time token (e.g., alphanumeric code) to the user device 102. The registration information may include, for example, an email address associated with the user device 102, a phone number associated with the user device 102, etc. Based at least in part on being associated with the account and having access to information received via the registration information, the user device 102 may receive the one-time token transmitted by the stateless infrastructure 110. The user device 102 may transmit the one-time token to the stateless infrastructure 110.

When the stateless infrastructure 110 determines that the one-time token received from the user device 102 matches (e.g., is the same as and/or corresponds to) the one-time token transmitted by the stateless infrastructure 110 to the user device 102 based at least in part on utilizing the registration information, the stateless infrastructure 110 may determine that the user device 102 is authorized to possess and/or access the private data in unencrypted and/or unhashed form. In this case, the stateless infrastructure 110 may transmit a response to the user device 102 indicating that the user device 102 is authorized to transmit the hashed private data portion to the stateless infrastructure 110.

Alternatively, when the stateless infrastructure 110 fails to receive the one-time token from the user device 102 within a predetermined amount of time and/or determines that the one-time token received from the user device 102 fails to match (e.g., is different from and/or fails to correspond to) the one-time token transmitted by the stateless infrastructure 110 to the user device 102 based at least in part on utilizing the registration information, the stateless infrastructure 110 may determine that the user device 102 is not authorized to possess and/or access the private data in unencrypted and/or unhashed form. In this case, the stateless infrastructure 110 may transmit the response to the user device 102 indicating that user device 102 is to refrain from transmitting the hashed private data portion to the stateless infrastructure 110.

As shown by reference numeral 330, based at least in part on receiving the hashed private data portion, the stateless infrastructure 110 may hash the hashed private data portion utilizing a first slow hashing algorithm and a secret key to determine a salt value. In some aspects, the stateless infrastructure 110 may utilize the same slow hashing algorithm to hash the hashed private data portion as utilized by the state infrastructure 110 to hash the hashed data entry portions (block 230).

In some aspects, the stateless infrastructure 110 may determine a secret key based at least in part on utilizing a random key generator. In some aspects, the secret key may be confidential to (e.g., known only to) the stateless infrastructure 110.

Based at least in part on receiving the hashed private data portion and/or determining the secret key, the stateless infrastructure 110 may utilize the first slow hashing algorithm (e.g., Blake2B, BLAKE, BLAKE3, ChaCha, etc.) to hash the hashed private data portion and/or the secret key as inputs, as discussed elsewhere herein. It is critical to use a slow hashing algorithm at this stage to hash the hash of the private data portion because of the stateless nature of the system and because the slow hashing algorithm is more resistant and less susceptible to brute-force attacks. The stateless infrastructure 110 is completely unaware of the private data in unencrypted and/or unhashed form and by utilizing the slow hashing algorithm, it becomes nearly impossible for an entity to reverse the hashing process to recover the underlying private data. As output, the first slow hashing algorithm may yield a salt value corresponding to the hash of the private data portion (and/or to the private data). As shown by reference numeral 340, based at least in part on determining the start value, the stateless infrastructure 110 may transmit the salt value to the user device 102.

Based at least in part on receiving the salt value, as shown by reference numeral 350, the user device 102 may again hash the private data utilizing a second slow hashing algorithm (e.g., Argon2ID) and the salt value to determine hashed salted private data. In some aspects, the stateless infrastructure 110 may configure the user device 102 to utilize the same slow hashing algorithm to hash the hashed private data portion as utilized by the state infrastructure 110 to hash the hashed data entry portions (block 240). The stateless infrastructure 110 is completely unaware of the private data in unencrypted and/or unhashed form and by utilizing the slow hashing algorithm, it becomes nearly impossible for an entity to reverse the hashing process to recover the underlying private data. As an output of the second slow hashing algorithm, the hashed salted private data may be in hexadecimal form. In other words, the hashed salted private data may be represented by a hexadecimal value including letters and/or numerals.

In some aspects, the user device 102 may apply the salt value to the private data prior to utilizing the second slow hashing algorithm. Applying the salt value may include adding random characters from the salt value to the hexadecimal value that represents the private data. Such random characters may be added as a prefix to the hexadecimal value, as a suffix to the hexadecimal value, and/or anywhere in the middle of the hexadecimal value. This enables obfuscating the private data and making it more difficult to recover the private data in unhashed plaintext form by, for example, reversing the hashing process to. Further, applying the start value enables the second slow hashing algorithm to output a unique hashed value even when underlying data (e.g., two separate pieces of private data) may be the same.

Based at least in part on determining the hashed salted private data, the user device 102 may determine a hashed salted private data portion by extracting a predetermined combination of letters and/or numerals from the hexadecimal value that represents the hashed salted private data. The extracted predetermined combination of letters and/or numerals may be referred to as an extracted part of the hexadecimal value that represents the hashed salted private data. In an example, the user device 102 may determine the hashed salted private data portion by extracting a prefix including a predetermined amount (e.g., the first five (or any other number)) of letters and/or numerals. In another example, the user device 102 may determine the hashed salted private data portion by extracting a suffix including a predetermined amount (e.g., the last five (or any other number)) of letters and/or numerals. In yet another example, the user device 102 may determine the hashed salted private data portion by extracting a middle section including a predetermined amount (e.g., five (or any other number)) of letters and/or numerals between the first letter and/or numeral and the last letter and/or numeral.

Based at least in part on determining the hashed salted private data portion, as shown by reference numeral 360, the user device 102 may transmit the hashed salted private data portion of the stateless infrastructure 110.

As shown by reference numeral 370, based at least in part on receiving the hashed salted private data portion, the stateless infrastructure 110 may compare the received hashed salted private data portion with the stored hashed salted data entries. In some aspects, the stateless infrastructure 110 may compare the extracted portion of the hexadecimal value that represents the hashed salted private data portion with one or more of the hexadecimal values that represent the stored hashed salted data entries (block 250).

In some cases, a result of the comparison may indicate that the extracted part of the hexadecimal value that represents the hashed salted private data portion fails to match (e.g., is not included within) at least one of the hexadecimal values that represents the stored hashed salted data entries. In these cases, the stateless infrastructure 110 may transmit a no-match message to the user device 102 indicating that the hashed salted private data portion failed to match (e.g., is not included within) at least one of the hexadecimal values that represents the stored hashed salted data entries. Based at least in part on receiving the no-match message, as shown by reference numeral 390, the user device 102 may determine that the private data has not been breached/compromised.

In some cases, the result of the comparison may indicate that the extracted part of the hexadecimal value that represents the hashed salted private data portion matches (e.g., is included within) at least one of the hexadecimal values that represents at least one stored hashed salted data entry. In this case, as shown by reference numeral 380, the stateless infrastructure 110 may transmit the at least one stored hashed salted data entry to the user device 102. In some aspects, the user device 102 may not be able to reverse the hashing process to uncover unencrypted and/or unhashed underlying data included in the received data.

As shown by reference numeral 390, based at least in part on receiving the at least one hashed salted data entry, the user device 102 may determine whether the private data is breached/compromised. In some aspects, to determine whether the private data is breached/compromised, the user device 102 may compare the received at least one hashed salted data entry to the previously determined hashed salted private data (block 350). In an example, the user device 102 may compare the hexadecimal value that represents the at least one hashed salted data entry to the hexadecimal value that represents the previously determined hashed salted private data.

When a result of the comparison indicates that the hexadecimal value that represents the at least one hashed salted data entry matches (e.g., is the same as) the hexadecimal value that represents the previously determined hashed salted private data, the user device 102 determines that the private data has been breached/compromised. Alternatively, when the result of the comparison indicates that the hexadecimal value that represents the at least one hashed salted data entry fails to match (e.g., is different from) the hexadecimal value that represents the previously determined hashed salted private data, the user device 102 determines that the private data has not been breached/compromised.

In this way, without communicating the private data externally from the user device, the stateless infrastructure and the user device may conduct the data breach lookup to determine whether the private data has been breached/compromised. When the private data has been breached/compromised, the user device may implement, without delay, restorative measures to mitigate effects of the data breach, thereby enabling efficient utilization of user device resources and/or stateless infrastructure resources (e.g., management resources, memory resources, computational/processing resources, power consumption resources, system bandwidth, network resources, etc.) for more suitable tasks associated with provision and receipt of network services.

Further, due to the stateless nature of the system, the stateless infrastructure is completely unaware of the private data. By hashing the private data, as discussed above, by utilizing a combination of one or more of fast hashing algorithms, slow hashing algorithms, secret keys, and salt values, the stateless system ensures that no information that may be utilized to recover the private data is transmitted out by the user device. Utilization of this combination is critical because it enables the stateless system to mitigate instances of the private data becoming breached/compromised. As a result, the stateless system enables the user device and the network service provider to conserve available resources (e.g., management resources, memory resources, computational/processing resources, power consumption resources, system bandwidth, network resources, etc.).

As indicated above, FIG. 3 is provided as an example. Other examples may differ from what is described with regard to FIG. 3.

Figure 4:
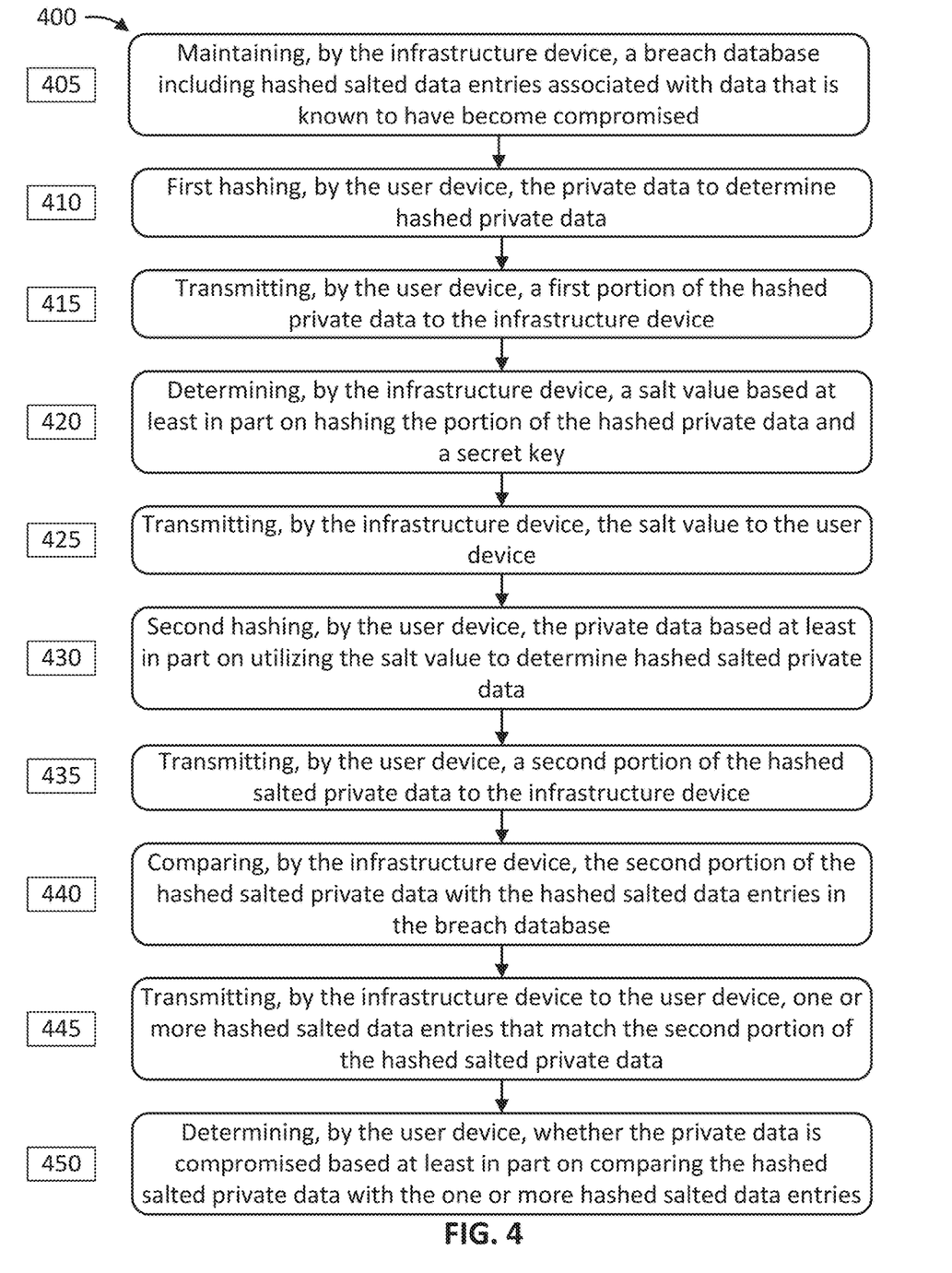
FIG. 4 is an illustration of an example process associated with a stateless system to enable data breach lookup, according to various aspects of the present disclosure.

FIG. 4 is an illustration of an example process 400 associated with a stateless system to enable data breach lookup, according to various aspects of the present disclosure. In some aspects, the process 400 may be performed by respective memories and/or respective processors/controllers (e.g., processor 106, processor 520) associated with one or more user devices (e.g., user device 102) executing respective client applications and/or by a memory and/or a processor/controller (e.g., processing unit 112, processor 520) associated with a stateless infrastructure (e.g., stateless infrastructure 110).

As shown by reference numeral 405, process 400 may include maintaining, by the infrastructure device, a breach database including hashed salted data entries associated with data that is known to have become compromised. For instance, the infrastructure device may utilize the associated processor/controller to maintain a breach database including hashed salted data entries associated with data that is known to have become compromised, as discussed elsewhere herein.

As shown by reference numeral 410, process 400 may include first hashing, by the user device, the private data to determine hashed private data. For instance, the user device may utilize the associated processor/controller to first hash the private data to determine hashed private data, as discussed elsewhere herein.

As shown by reference numeral 415, process 400 may include transmitting, by the user device, a first portion of the hashed private data to the infrastructure device. For instance, the user device may utilize an associated communication interface (e.g., communication interface 570) with the associated processor/controller to transmit a first portion of the hashed private data to the infrastructure device, as discussed elsewhere herein.

As shown by reference numeral 420, process 400 may include determining, by the infrastructure device, a salt value based at least in part on hashing the portion of the hashed private data and a secret key. For instance, the infrastructure device may utilize the associated processor/controller to determine a salt value based at least in part on hashing the portion of the hashed private data and a secret key, as discussed elsewhere herein.

As shown by reference numeral 425, process 400 may include transmitting, by the infrastructure device, the salt value to the user device. For instance, the infrastructure device may utilize an associated communication interface (e.g., communication interface 570) with the associated processor/controller to transmit the salt value to the user device, as discussed elsewhere herein.

As shown by reference numeral 430, process 400 may include second hashing, by the user device, the private data based at least in part on utilizing the salt value to determine hashed salted private data. For instance, the user device may utilize the associated processor/controller to second hash the private data based at least in part on utilizing the salt value to determine hashed salted private data, as discussed elsewhere herein.

As shown by reference numeral 435, process 400 may include transmitting, by the user device, a second portion of the hashed salted private data to the infrastructure device. For instance, the user device may utilize an associated communication interface (e.g., communication interface 570) with the associated processor/controller to transmit a second portion of the hashed salted private data to the infrastructure device, as discussed elsewhere herein.

As shown by reference numeral 440, process 400 may include comparing, by the infrastructure device, the second portion of the hashed salted private data with the hashed salted data entries in the breach database. For instance, the infrastructure device may utilize the associated processor/controller to compare the second portion of the hashed salted private data with the hashed salted data entries in the breach database, as discussed elsewhere herein.

As shown by reference numeral 445, process 400 may include transmitting, by the infrastructure device to the user device, one or more hashed salted data entries that match the second portion of the hashed salted private data. For instance, the infrastructure device may utilize an associated communication interface (e.g., communication interface 570) with the associated processor/controller to transmit, to the user device, one or more hashed salted data entries that match the second portion of the hashed salted private data, as discussed elsewhere herein.

As shown by reference numeral 450, process 400 may include determining, by the user device, whether the private data is compromised based at least in part on comparing the hashed salted private data with the one or more hashed salted data entries. For instance, the user device may utilize the associated processor/controller to determine whether the private data is compromised based at least in part on comparing the hashed salted private data with the one or more hashed salted data entries, as discussed elsewhere herein.

Process 400 may include additional aspects, such as any single aspect or any combination of aspects described below and/or in connection with one or more other processes described elsewhere herein.

In a first aspect, in process 400, calculating the hash of the private data includes the user device utilizing a fast hashing algorithm that is utilized by the infrastructure device to calculate hashes of one or more data entries associated with the data that is known to have become compromised.

In a second aspect, alone or in combination with the first aspect, process 400 may include determining, by the first user device, the first portion of the hashed private data based at least in part on extracting a predetermined amount of characters from a hexadecimal value representing the hashed private data.

In a third aspect, alone or in combination with the first through second aspects, process 400 may include determining, by the first user device, the first portion of the hashed private data based at least in part on extracting a predetermined amount of characters from a hexadecimal value representing the hashed private data.

In a fourth aspect, alone or in combination with the first through third aspects, process 400 may include applying, by the user device prior to second hashing the private data, the salt value to a hexadecimal value that represents the private data.

In a fifth aspect, alone or in combination with the first through fourth aspects, process 400 may include verifying, by the infrastructure device or the user device prior to the user device transmitting the first portion of the hashed private data, that the user device is authorized to have access to the private data in plaintext form.

In a sixth aspect, alone or in combination with the first through fifth aspects, process 400 may include determining, by the user device, that the private data is compromised based at least in part on determining that the hashed salted private data matches the one or more hashed salted data entries.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of example devices 500, according to various aspects of the present disclosure. In some aspects, the example devices 500 may form part of or implement the systems, devices, environments, infrastructures, components, or the like described elsewhere herein (e.g., FIG. 1) and may be used to perform the example processes described elsewhere herein. The example devices 500 may include a universal bus 510 communicatively coupling a processor 520, a memory 530, a storage component 540, an input component 550, an output component 560, and a communication interface 570.

Bus 510 may include a component that permits communication among multiple components of a device 500. Processor 520 may be implemented in hardware, firmware, and/or a combination of hardware and software. Processor 520 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 520 may include one or more processors capable of being programmed to perform a function. Memory 530 may include a random access memory (RAM), a read only memory (ROM), and/or another type of dynamic or static storage device (e.g., a flash memory, a magnetic memory, and/or an optical memory) that stores information and/or instructions for use by processor 520.

Storage component 540 may store information and/or software related to the operation and use of a device 500. For example, storage component 540 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 550 may include a component that permits a device 500 to receive information, such as via user input (e.g., a touch screen display, a keyboard, a keypad, a mouse, a button, a switch, and/or a microphone). Additionally, or alternatively, input component 550 may include a component for determining location (e.g., a global positioning system (GPS) component) and/or a sensor (e.g., an accelerometer, a gyroscope, an actuator, another type of positional or environmental sensor, and/or the like). Output component 560 may include a component that provides output information from device 500 (via, for example, a display, a speaker, a haptic feedback component, an audio or visual indicator, and/or the like).

Communication interface 570 may include a transceiver-like component (e.g., a transceiver, a separate receiver, a separate transmitter, and/or the like) that enables a device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

A device 500 may perform one or more processes described elsewhere herein. A device 500 may perform these processes based on processor 520 executing software instructions stored by a non-transitory computer-readable medium, such as memory 530 and/or storage component 540. As used herein, the term "computer-readable medium" may refer to a non-transitory memory device. A memory device may include memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 5 are provided as an example. In practice, a device 500 may include additional components, fewer components, different components, or differently arranged components than those shown in FIG. 5. Additionally, or alternatively, a set of components (e.g., one or more components) of a device 500 may perform one or more functions described as being performed by another set of components of a device 500.

As indicated above, FIG. 5 is provided as an example. Other examples may differ from what is described with regard to FIG. 5.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising: an infrastructure device; and
a user device in communication with the infrastructure device, wherein, to determine whether private data associated with the user device is compromised,
the infrastructure device is configured to store, in a database, hashed salted data entries associated with data that is known to have become compromised;
the user device is configured to calculate a first hash of the private data to determine hashed private data;
the user device is configured to transmit a first portion of the hashed private data to the infrastructure device;
the infrastructure device is configured to determine a salt value based at least in part on hashing the first portion of the hashed private data and a secret key;
the infrastructure device is configured to transmit the salt value to the user device;
the user device is configured to calculate a second hash of the private data based at least in part on utilizing the salt value to determine hashed salted private data;
the user device is configured to transmit a second portion of the hashed salted private data to the infrastructure device;
the infrastructure device is configured to compare the second portion of the hashed salted private data with the hashed salted data entries stored in the database;
the infrastructure device is configured to transmit, to the user device, (i) one or more hashed salted data entries that match the second portion of the hashed salted private data, or (ii) a message indicating that no hashed salted data entry matched the second portion of the hashed salted private data;
the user device is configured to compare, when the one or more hashed salted data entries are received from the infrastructure device, the hashed salted private data with the one or more hashed salted data entries;
the user device is configured to determine that the private data is compromised due to a data breach when the hashed salted private data matches the one or more hashed salted data entries; and
the user device is configured to implement, based at least in part on determining that the private data is compromised, a restorative measure to mitigate effects of the data breach.

2. The system of claim 1, wherein, to calculate the hash of the private data, the user device is configured to utilize a fast hashing algorithm that is utilized by the infrastructure device to calculate hashes of one or more data entries associated with the data that is known to have become compromised.

3. The system of claim 1, wherein the user device is configured to determine the first portion of the hashed private data based at least in part on extracting a predetermined amount of characters from a hexadecimal value representing the hashed private data.

4. The system of claim 1, wherein, prior to second hashing the private data, the user device is configured to apply the salt value to a hexadecimal value that represents the private data.

5. The system of claim 1, wherein, prior to the user device transmitting the first portion of the hashed private data, the infrastructure device or the user device is configured to verify that the user device is authorized to have access to the private data in plaintext form.

6. The system of claim 1, wherein, to transmit the first portion, the user device is configured to transmit the first portion of a first representation of the hashed private data, and to transmit the second portion, the user device is configured to transmit the second portion of a second representation of the hashed salted private data.

7. The system of claim 1, wherein the infrastructure device is configured to maintain the breach database periodically.

8. A method in system including a user device in communication with an infrastructure device to determine whether private data associated with the user device is compromised, the method comprising:
storing, by the infrastructure device in a database, hashed salted data entries associated with data that is known to have become compromised;
calculating, by the user device, a first hash of the private data to determine hashed private data;
transmitting, by the user device, a first portion of the hashed private data to the infrastructure device;
determining, by the infrastructure device, a salt value based at least in part on hashing the first portion of the hashed private data and a secret key; transmitting, by the infrastructure device, the salt value to the user device;
calculating, by the user device, a second hash of the private data based at least in part on utilizing the salt value to determine hashed salted private data;
transmitting, by the user device, a second portion of the hashed salted private data to the infrastructure device;
comparing, by the infrastructure device, the second portion of the hashed salted private data with the hashed salted data entries stored in the database;
transmitting, by the infrastructure device to the user device, (i) one or more hashed salted data entries that match the second portion of the hashed salted private data, or (ii) a message indicating that no hashed salted data entry matched the second portion of the hashed salted private data; and
comparing, by the user device, when the one or more hashed salted data entries are received from the infrastructure device, the hashed salted private data with the one or more hashed salted data entries;
determining, by the user device, that the private data is compromised due to a data breach when the hashed salted private data matches the one or more hashed salted data entries; and implementing, by the user device based at least in part on determining that the private data is compromised, a restorative measure to mitigate effects of the data breach.

9. The method of claim 8, wherein calculating the hash of the private data includes the user device utilizing a fast hashing algorithm that is utilized by the infrastructure device to calculate hashes of one or more data entries associated with the data that is known to have become compromised.

10. The method of claim 8, further comprising:
determining, by the first user device, the first portion of the hashed private data based at least in part on extracting a predetermined amount of characters from a hexadecimal value representing the hashed private data.

11. The method of claim 8, further comprising:
applying, by the user device prior to second hashing the private data, the salt value to a hexadecimal value that represents the private data.

12. The method of claim 8, further comprising:
verifying, by the infrastructure device or the user device prior to the user device transmitting the first portion of the hashed private data, that the user device is authorized to have access to the private data in plaintext form.

13. The method of claim 8, wherein transmitting the first portion includes transmitting the first portion of a first representation of the hashed private data, and transmitting the second portion includes transmitting the second portion of a second representation of the hashed salted private data.

14. The method of claim 8, wherein maintaining the breach database includes the infrastructure device maintaining the peace database periodically.

15. A non-transitory computer-readable medium configured to store instructions, which when executed by a user device and an infrastructure device in communication with each other to determine whether private data associated with the user device is compromised, configure:
the infrastructure device to store, in a database, hashed salted data entries associated with data that is known to have become compromised;
the user device to calculate a first hash of the private data to determine hashed private data;
the user device to transmit a first portion of the hashed private data to the infrastructure device;
the infrastructure device to determine a salt value based at least in part on hashing the first portion of the hashed private data and a secret key;
the infrastructure device to transmit the salt value to the user device; the user device to calculate a second hash of the private data based at least in part on utilizing the salt value to determine hashed salted private data;
the user device to transmit a second portion of the hashed salted private data to the infrastructure device;
the infrastructure device to compare the second portion of the hashed salted private data with the hashed salted data entries stored in the database;
the infrastructure device to transmit, to the user device, one or more hashed salted data entries that match the second portion of the hashed salted private data;
the user device to compare the hashed salted private data with the one or more hashed salted data entries;
the infrastructure device to transmit, to the user device, (i) one or more hashed salted data entries that match the second portion of the hashed salted private data, or (ii) a message indicating that no hashed salted data entry matched the second portion of the hashed salted private data;

the user device to compare, when the one or more hashed salted data entries are received from the infrastructure device, the hashed salted private data with the one or more hashed salted data entries;

the user device to determine that the private data is compromised due to a data breach when the hashed salted private data matches the one or more hashed salted data entries; and the user device to implement, based at least in part on determining that the private data is compromised, a restorative measure to mitigate effects of the data breach.

16. The non-transitory computer-readable medium of claim 15, wherein, to calculate the hash of the private data, the instructions configure the user device to utilize a fast hashing algorithm that is utilized by the infrastructure device to calculate hashes of one or more data entries associated with the data that is known to have become compromised.

17. The non-transitory computer-readable medium of claim 15, wherein the instructions configure the user device to determine the first portion of the hashed private data based at least in part on extracting a predetermined amount of characters from a hexadecimal value representing the hashed private data.

18. The non-transitory computer-readable medium of claim 15, wherein, prior to second hashing the private data, the instructions configure the user device to apply the salt value to a hexadecimal value that represents the private data.

19. The non-transitory computer-readable medium of claim 15, wherein, prior to the user device transmitting the first portion of the hashed private data, the instructions configure the infrastructure device or the user device to verify that the user device is authorized to have access to the private data in plaintext form.

20. The non-transitory computer-readable medium of claim 15, wherein, to transmit the first portion, the instructions configure the user device to transmit the first portion of a first representation of the hashed private data, and to transmit the second portion, the instructions configure the user device to transmit the second portion of a second representation of the hashed salted private data.

* * * * *